US011976494B2

(12) United States Patent
Luebeck

(10) Patent No.: US 11,976,494 B2
(45) Date of Patent: May 7, 2024

(54) DOOR HANDLE ASSEMBLY

(71) Applicant: Carrier Corporation, Palm Beach Gardens, FL (US)

(72) Inventor: Jon Marc Luebeck, Stayton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 614 days.

(21) Appl. No.: 17/254,652

(22) PCT Filed: Sep. 8, 2020

(86) PCT No.: PCT/US2020/049711

§ 371 (c)(1),
(2) Date: Dec. 21, 2020

(87) PCT Pub. No.: WO2021/050425

PCT Pub. Date: Mar. 18, 2021

(65) Prior Publication Data

US 2022/0042347 A1 Feb. 10, 2022

(51) Int. Cl.
*E05B 3/02* (2006.01)
*E05B 1/00* (2006.01)
*E05B 15/00* (2006.01)

(52) U.S. Cl.
CPC ................ *E05B 3/02* (2013.01); *E05B 1/003* (2013.01); *E05B 15/0033* (2013.01)

(58) Field of Classification Search
CPC ... E05B 3/00; E05B 3/02; E05B 3/003; E05B 3/04; E05B 3/06; E05B 3/10; E05B 1/003; E05B 63/0056; E05B 15/0033
(Continued)

(56) References Cited

U.S. PATENT DOCUMENTS 3,427,061 A * 2/1969 Gresham ............. E05B 15/0033 292/357
5,288,116 A 2/1994 Donofrio
(Continued)

FOREIGN PATENT DOCUMENTS

CN 202090699 12/2011
CN 203271277 11/2013
(Continued)

OTHER PUBLICATIONS

International Search Report and Written Opinion for International Application No. PCT/US2020/049711 mail date of Dec. 4, 2020.
(Continued)

*Primary Examiner* — Kristina R Fulton
*Assistant Examiner* — James Edward Ignaczewski
(74) *Attorney, Agent, or Firm* — Carlson, Gaskey & Olds, P.C.

(57) ABSTRACT

A handle assembly includes a hub body that extends along a central longitudinal axis that has a first end portion that includes a first set of handle adapter engagement features and a second set of handle adapter engagement features. A handle adapter includes at least one of a first set of hub engagement features for engaging the first set of handle adapter engagement features or a second set of hub engagement features for engaging the second set of handle adapter engagement features. A handle engages both the handle adapter and the hub body.

2 Claims, 4 Drawing Sheets

(58) Field of Classification Search
USPC .......................................................... 292/348
See application file for complete search history.

(56) References Cited

U.S. PATENT DOCUMENTS

| | | | | |
|---|---|---|---|---|
| 6,048,007 | A | 4/2000 | Shor | |
| 6,131,970 | A | 10/2000 | Hurst | |
| 6,230,528 | B1 * | 5/2001 | Don | E05B 15/02 70/451 |
| 6,532,779 | B2 | 3/2003 | Shen | |
| 6,842,946 | B2 | 1/2005 | Hayden | |
| 7,281,738 | B2 | 10/2007 | Shen et al. | |
| 8,136,375 | B2 | 3/2012 | Shen | |
| 10,273,714 | B2 | 4/2019 | Kim | |
| 2005/0046203 | A1 * | 3/2005 | Huang | E05B 13/004 292/348 |
| 2008/0252086 | A1 * | 10/2008 | Houis | E05B 3/00 292/348 |
| 2010/0148524 | A1 * | 6/2010 | Czerwinski, Jr. | E05B 15/02 292/299 |
| 2014/0217755 | A1 | 8/2014 | Kom | |
| 2020/0115921 | A1 * | 4/2020 | Alber | B01D 29/05 |

FOREIGN PATENT DOCUMENTS

| | | | | |
|---|---|---|---|---|
| CN | 203394173 | | 1/2014 | |
| CN | 204782277 | | 11/2015 | |
| CN | 105927056 | | 1/2018 | |
| CN | 105569442 | | 5/2019 | |
| CN | 110709567 | A * | 1/2020 | E05B 3/00 |
| DE | 10250960 | B4 * | 6/2019 | E05B 3/04 |
| EP | 2042671 | | 4/2009 | |
| EP | 2042671 | A2 * | 4/2009 | E05B 15/0053 |
| EP | 3203000 | | 8/2017 | |
| GB | 2504806 | | 2/2014 | |
| GB | 2504806 | | 12/2014 | |
| KR | 200165524 | | 2/2000 | |
| KR | 200217305 | | 3/2001 | |
| KR | 101732962 | | 5/2017 | |
| NL | 1021120 | | 1/2004 | |
| WO | WO-2005090720 | A1 * | 9/2005 | E05B 47/068 |

OTHER PUBLICATIONS

International Preliminary Report on Patentability for International Application No. PCT/US2020/049711 dated Mar. 24, 2022.

* cited by examiner

DOOR HANDLE ASSEMBLY

BACKGROUND

Existing door handle assemblies include various components that are assembled and mounted to a door. In order to change a style of handle on the door handle assembly, the entire door handle assembly must be replaced.

SUMMARY

In one exemplary embodiment, a handle assembly includes a hub body that extends along a central longitudinal axis that has a first end portion that includes a first set of handle adapter engagement features and a second set of handle adapter engagement features. A handle adapter includes at least one of a first set of hub engagement features for engaging the first set of handle adapter engagement features or a second set of hub engagement features for engaging the second set of handle adapter engagement features. A handle engages both the handle adapter and the hub body.

In a further embodiment of any of the above, the first set of handle adapter engagement features are located radially inward from the second set of handle adapter engagement features relative to the central longitudinal axis of the hub body.

In a further embodiment of any of the above, a protrusion extends longitudinally from the first end of the hub body and located within an opening in the handle adapter.

In a further embodiment of any of the above, the first set of handle adapter engagement features includes at least one first protrusion or at least one first recess. The first set of handle adapter engagement features includes the other of the at least one first protrusion and the at least one first recesses.

In a further embodiment of any of the above, a handle adapter retention pin extends through corresponding openings in the handle adapter and the protrusion.

In a further embodiment of any of the above, the retention pin is spaced from the handle.

In a further embodiment of any of the above, a handle retention pin is in engagement with the handle and the handle adapter and spaced from the protrusion.

In a further embodiment of any of the above, the at least one first protrusion includes a handle adapter protrusion located at a proximal end of the handle adapter. The at least one first recess includes a handle adapter recess formed by a retention flange on the hub body.

In a further embodiment of any of the above, the handle adapter forms a ring.

In a further embodiment of any of the above, the at least one first protrusion includes a handle adapter protrusion located at a proximal end of the handle adapter and on a perimeter of the ring. The at least one first recess includes hub recess formed adjacent a perimeter of the hub.

In a further embodiment of any of the above, the handle adapter includes an inner surface that engages a retention flange on the hub body.

In a further embodiment of any of the above, the retention flange includes a plurality of protrusions on a radially inner side of the retention flange. The ring includes a flange that has alignment protrusions that extend radially inward from the flange and are aligned with a corresponding one of the plurality of protrusions on the radial inner side of the retention flange.

In a further embodiment of any of the above, the handle includes a hub protrusion that has a plurality of alignment recesses that align with corresponding ones of the plurality of protrusions on the radially inner side of the retention flange.

In a further embodiment of any of the above, a retention pin extends through the handle and protrusion extending from the first end of the hub body.

In another exemplary embodiment, a method of assembling a door handle includes the step of positioning a handle adapter adjacent a first end portion of a hub body. One of a first set of handle adapter engagement features or a second set of handle adapter engagement features are engaged on the hub body with a corresponding one of a first set of hub engagement feature or a second set of hub engagement features on the handle adapter. A handle is engaged with the handle adapter.

In a further embodiment of any of the above, the first set of handle adapter engagement features are located radially inward from the second set of handle adapter engagement features relative to the central longitudinal axis of the hub body.

In a further embodiment of any of the above, the first set of handle adapter engagement features includes at least one first protrusion or at least one first recess. The first set of handle adapter engagement features includes the other of the at least one first protrusion and the at least one first recesses.

In a further embodiment of any of the above, the at least one first protrusion includes a handle adapter protrusion located at a proximal end of the handle adapter. The at least one first recess includes a handle adapter recess formed by a retention flange on the hub body.

In a further embodiment of any of the above, the handle adapter forms a ring and the at least one first protrusion includes a handle adapter protrusion located at a proximal end of the handle adapter and on a perimeter of the ring. The at least one first recess includes hub recess formed adjacent a perimeter of the hub.

In a further embodiment of any of the above, the handle adapter includes an inner surface that engages a retention flange on the hub body.

DETAILED DESCRIPTION

Figure 1:
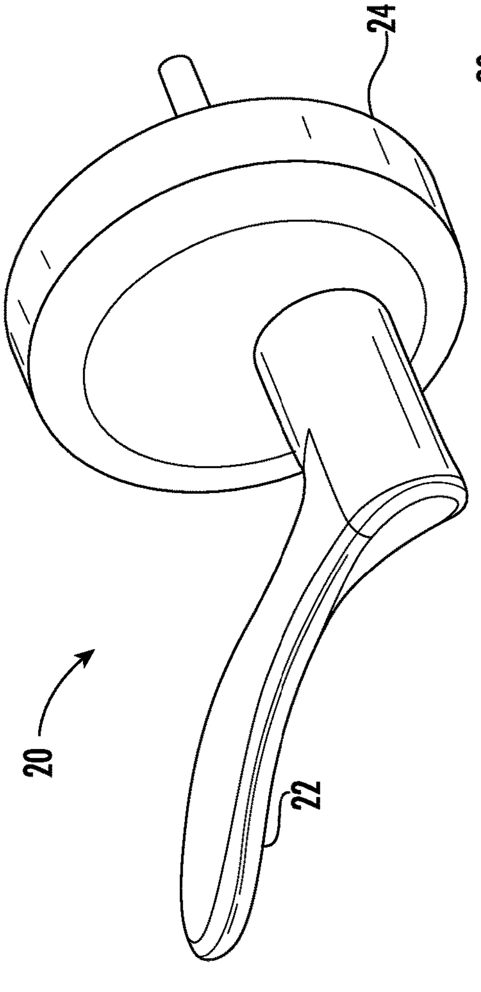
FIG. 1 illustrates a front perspective view of an example door handle assembly.
Figure 2:
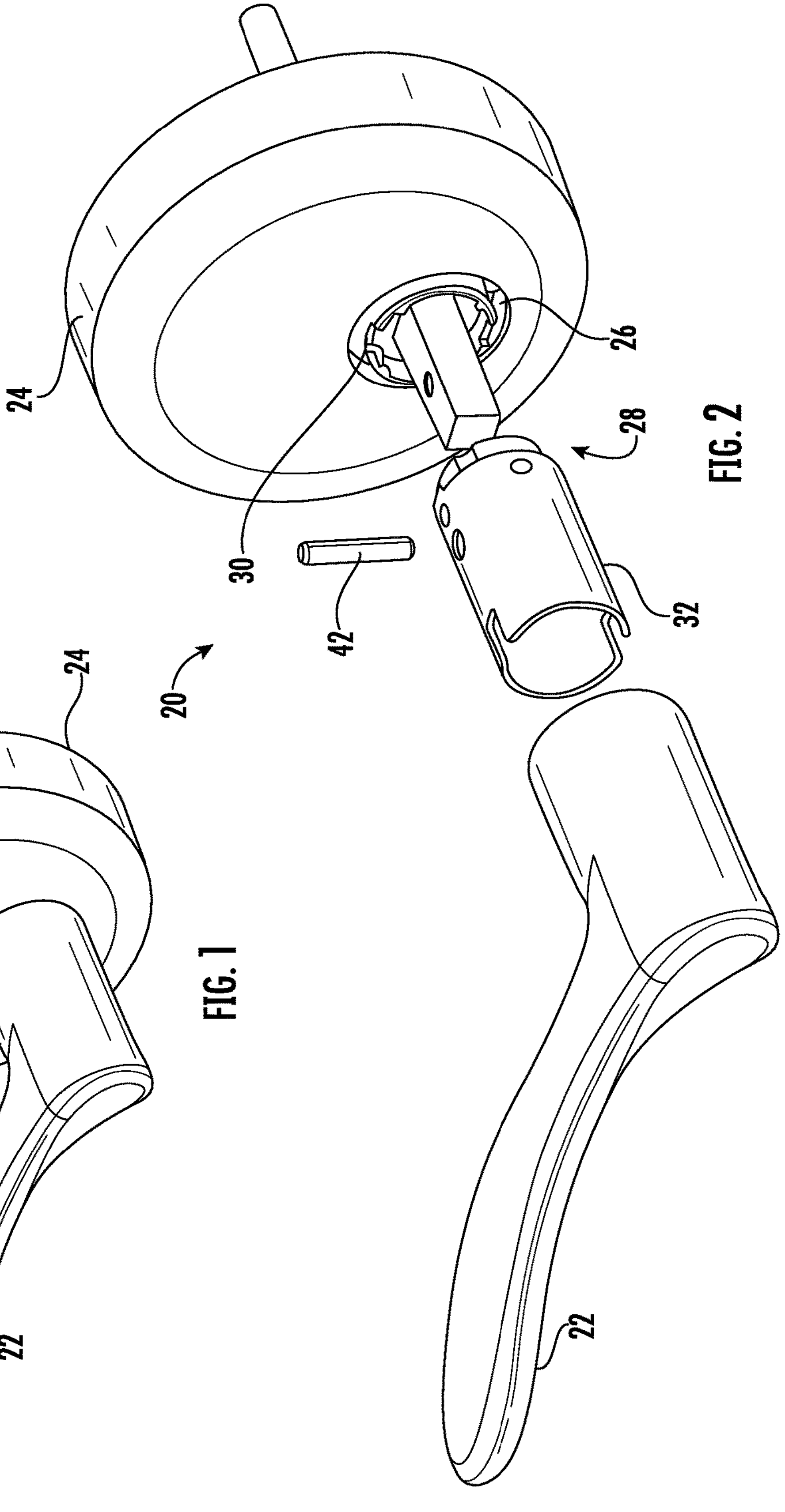
FIG. 2 illustrates a partially exploded front perspective view of the example door handle assembly of FIG. 1.

FIGS. 1 and 2 illustrate an example door handle assembly 20. The door handle assembly 20 includes a handle 22 and an escutcheon plate 24 facing the handle 22 with the escutcheon plate 24 attached to a mounting plate 26. The handle 22 is secured relative to the mounting plate 26 through a hub assembly 28. In the illustrated example, the hub assembly 28 includes at least one of a hub body 30 and a handle adapter 32. However, other components may be included with the hub assembly 28.

Figure 3:
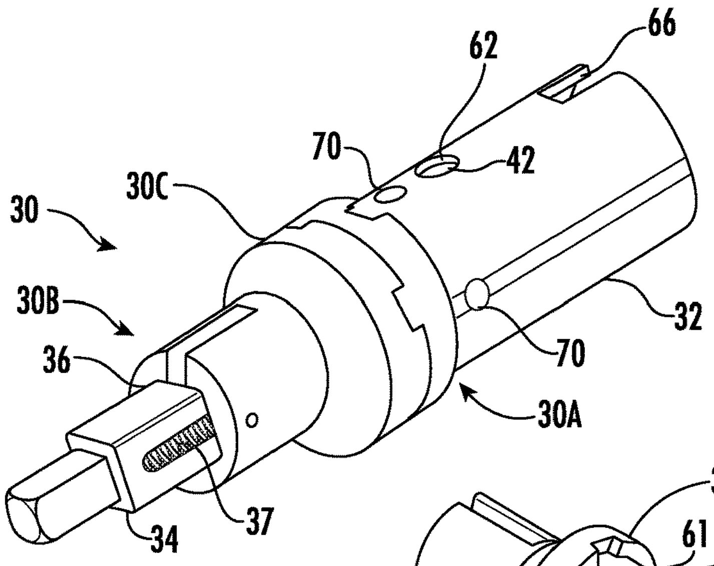
FIG. 3 illustrates an example hub assembly and spindle for use with the door handle assembly of FIG. 1.

As shown in FIG. 3, the adapter 32 is located adjacent a first end portion 30A of the hub body 30 and a spindle 34 is located adjacent a second end portion 30B of the hub body 30. The spindle 34 is slideably received within a spindle recess 36 in the second end portion 30B of the hub body 30 and is biased toward an extended position with a spring 37. The spindle 34 also includes a tip portion for engaging a locking portion or mortice (not shown).

Figure 4:
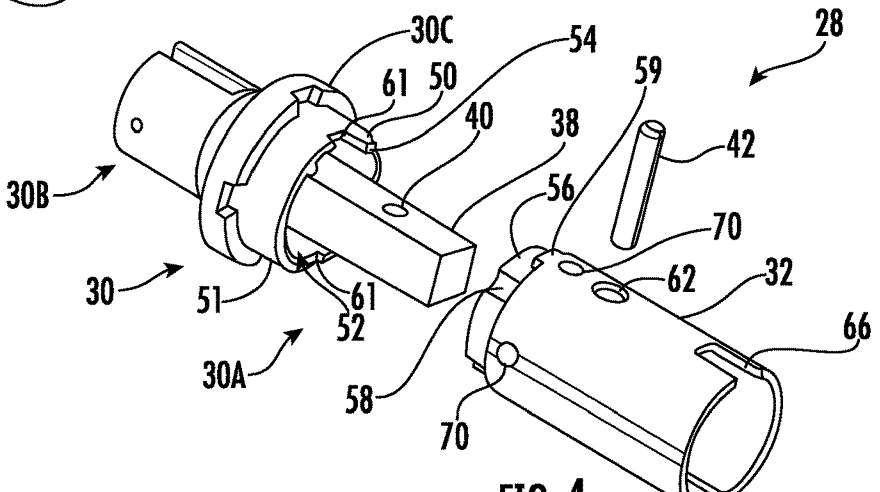
FIG. 4 illustrates a partially exploded perspective view of the hub assembly of FIG. 3.
Figure 5:
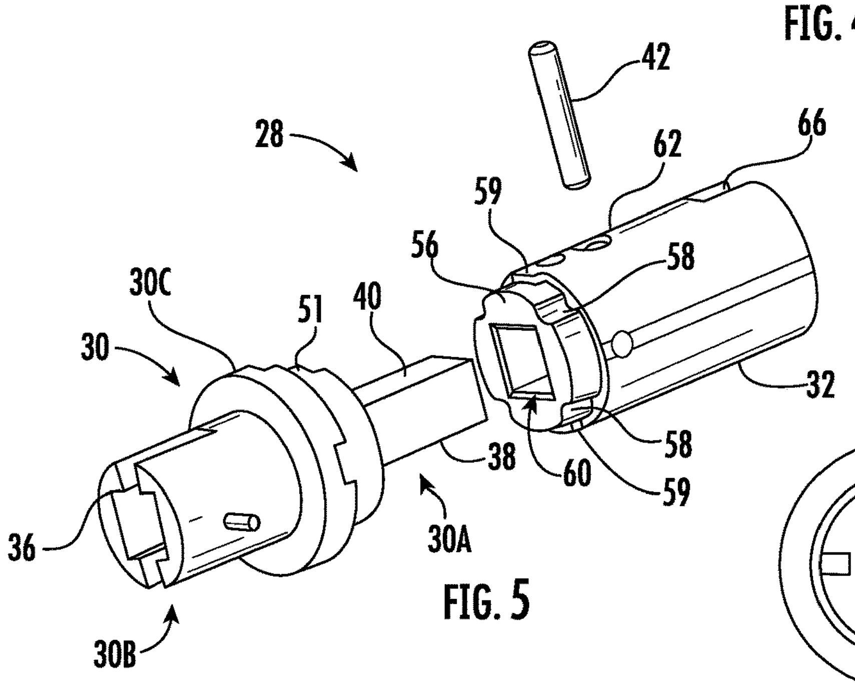
FIG. 5 illustrates another partially exploded perspective view of the hub assembly of FIG. 3.
Figure 6:
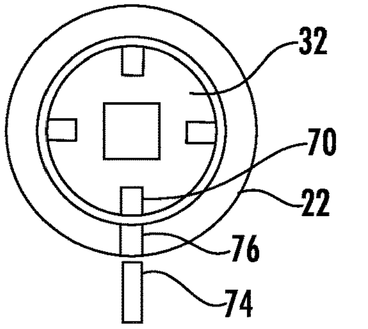
FIG. 6 illustrates a cross-sectional view taken along line 6-6 of FIG. 2.

As shown in FIGS. 3-5, the hub body 30 also includes a mid-portion 30C separating the first end portion 30A from the second end portion 30B. The first end portion 30A includes an attachment protrusion 38 having a pin aperture 40 for accepting a retention pin 42 that secures the adapter 32 relative to the hub body 30. The first end portion 30A also includes a retention flange 50 that surrounds the protrusion 38 and at least partially defines an adapter recess 52 with the protrusion 38. In one example, the retention flange 50 extends axially from the mid-portion 30C of the hub body 30. In this disclosure, axial or axially and radial or radially is in relation to a central longitudinal axis extending though a center of the hub body 30 unless stated otherwise.

In the illustrated example, the retention flange 50 includes a plurality of alignment protrusions 54 that extend radially inward from an inner surface of the retention flange 50. The adapter 32 includes a hub protrusion 56 that is accepted within the adapter recess 52. Additionally, the hub protrusion 56 includes alignment recesses 58 that are aligned with a corresponding one of the plurality of alignment protrusions 54.

Additionally, the adapter 32 includes exterior hub protrusions 59 that mate with corresponding adapter recesses 61 in a distal end of the retention flange 50. The adapter 32 also includes a central opening 60 for accepting the protrusion 38. The central opening 60 and the protrusion 38 include a corresponding cross sectional profile. The engagement of the protrusion 38 with the central opening 60 and the hub protrusion 56 with the adapter recess 52 provides a reduction in relative movement between the adapter 32 and the hub body 30 to reduce relative play between the handle 22 and the hub body 30. The adapter 32 also includes an adapter aperture opening 62 that is aligned with the pin aperture 40 in the protrusion 38 to secure the adapter 32 from moving longitudinally along the protrusion 38.

The adapter 32 also includes at least one handle alignment recess 66 located at a distal end of adapter 32 to facilitate alignment between the handle 22 and the adapter 32. The adapter 32 also includes at least one handle retention aperture 70 and the handle 22 includes at least one corresponding handle aperture 72. A handle retention pin 74 extends through the handle retention aperture 70 and the handle aperture 72 to prevent the handle 22 from moving longitudinally relative to the adapter 32. Additionally, the handle retention pin 74 could be threaded.

Figure 7:
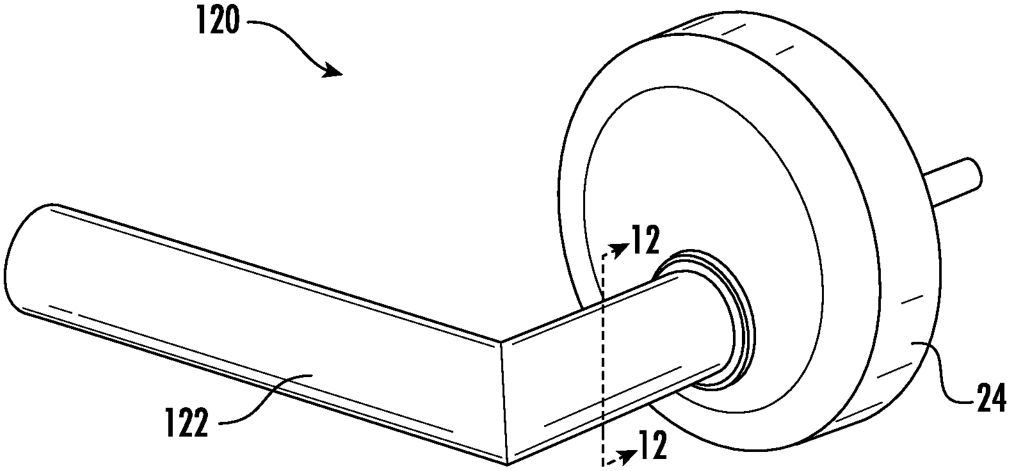
FIG. 7 illustrates a front perspective view of another example door handle assembly.
Figure 8:
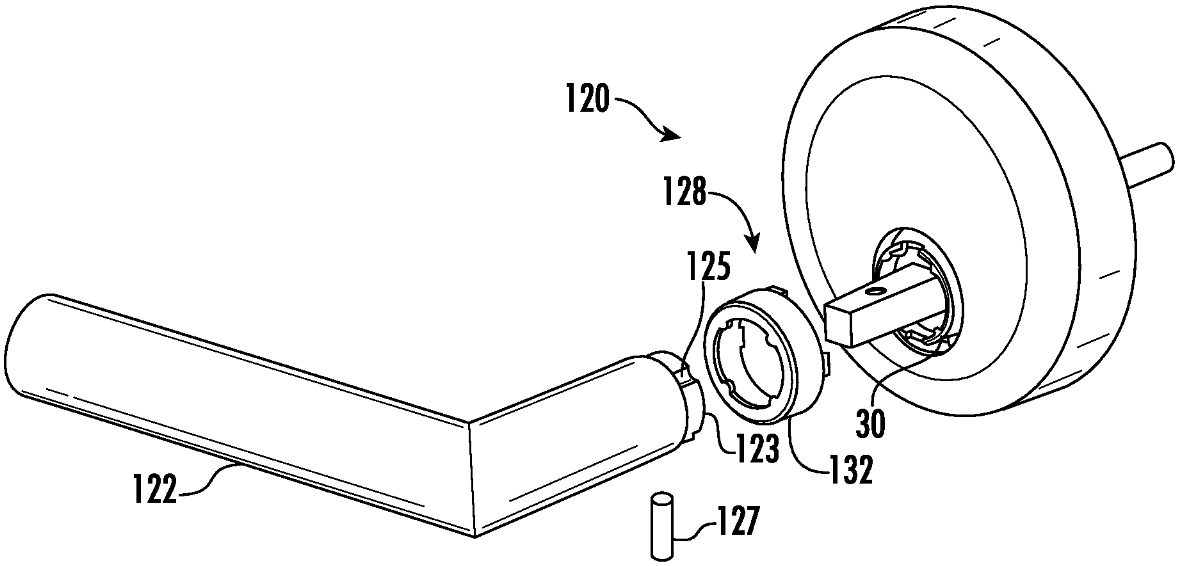
FIG. 8 illustrates a partially exploded front perspective view of the example door handle assembly of FIG. 7.

FIGS. 7 and 8 illustrated another example door handle assembly 120. The door handle assembly 120 is similar to the door handle assembly 20 except where described below or shown in the Figures. The door handle assembly 120 includes a handle 122 with the escutcheon plate 24 facing the handle 122 and attached to the mounting plate 26. The handle 122 is secured relative to the mounting plate 26 through a hub assembly 128. In the illustrated example, the hub assembly 128 includes at least one of the hub body 30 and a handle adapter 132. However, other components may be included with the hub assembly 128.

Figure 9:
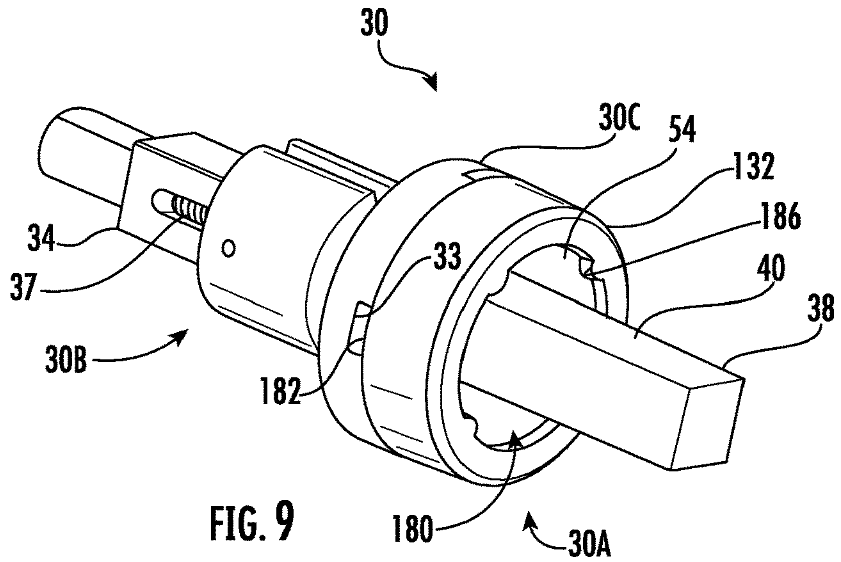
FIG. 9 illustrates another example hub assembly and spindle for use with the door handle assembly of FIG. 7.
Figure 10:
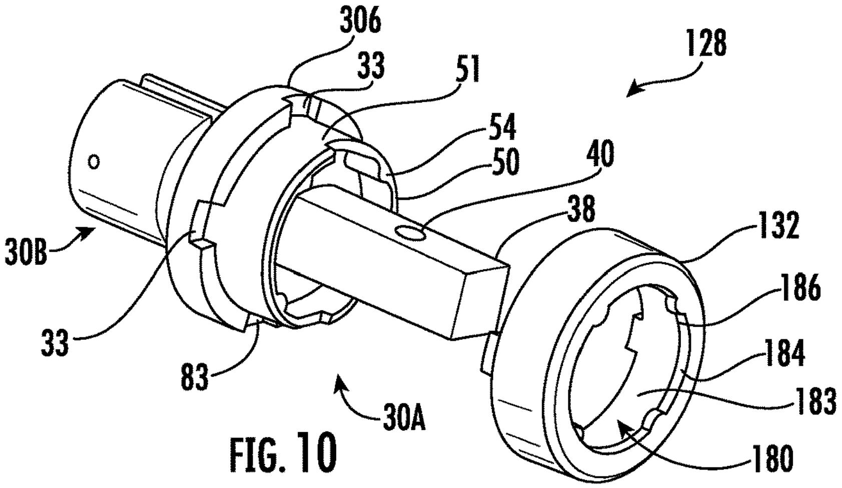
FIG. 10 illustrates a partially exploded perspective view of the hub assembly of FIG. 9.
Figure 11:
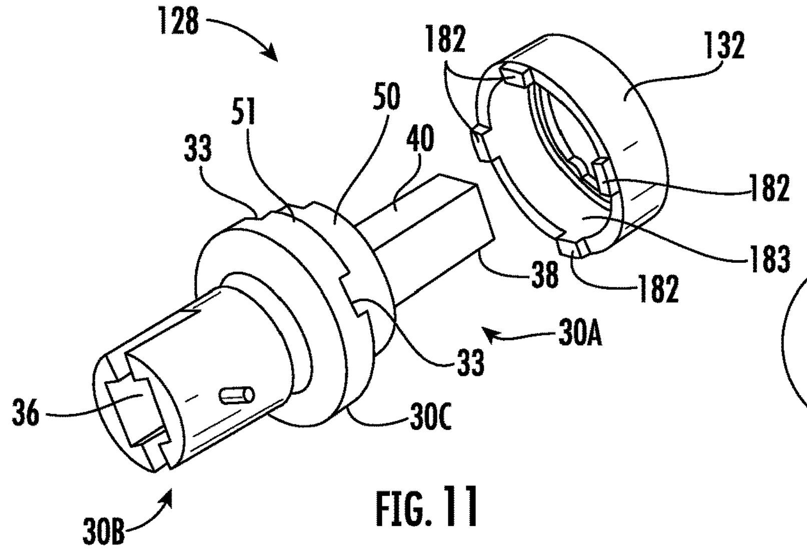
FIG. 11 illustrates another partially exploded perspective view of the of the hub assembly of FIG. 9.
Figure 12:
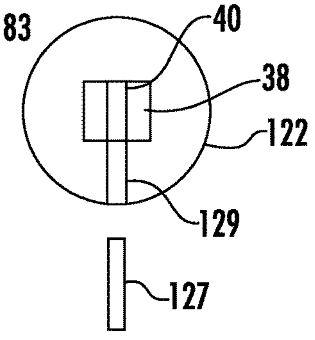
FIG. 12 illustrates a cross-sectional view taken along line 12-12 of FIG. 7.

As shown in FIG. 9, the adapter 132 forms a ring and is located adjacent the first end portion 30A of the hub body 30 and at least partially engages the mid-portion 30C and includes a central opening 180 for accepting the protrusion 38. The mid-portion 30C include a plurality of adapter recesses 33 evenly circumferentially spaced around the hub body 30 that mate with corresponding hub protrusions 182 that extend from a first end of the adapter 132. The adapter 132 includes a cylindrical cross section and at least a portion of an inner surface 183 of the cylindrical portion of the adapter 132 is adjacent to or in contact with a radially outer surface 51 of the retention flange 50. A distal end of the adapter 132 also includes a flange 184 that extends radially inward and covers a distal end of the retention flange 50. The flange 184 also includes alignment protrusions 186 that align with and cover distal ends of the alignment protrusions 54 on the retention flange 50.

As shown in FIGS. 7-8 and 9, the handle 22 includes a hub protrusion 123 that fits radially inside of the flange 184 on the adapter 132 and the retention flange 50 on the hub body 30. The hub protrusion 123 also includes alignment recesses 125 that align with the alignment protrusions 186 on the adapter 132 and the alignment protrusions 54 on the hub body 30.

The engagement of the hub protrusion 123 with the adapter 132 and the hub body 30 reduces relative movement between the handle 122 and the hub body 30. Additionally, a retention pin 127 fixes the handle 122 from moving longitudinally relative to the protrusion 38 by extending through a pin opening 129 in the handle 122 that is aligned with the pin aperture 40 in the protrusion 38. Furthermore, the handle retention pin 127 could be threaded.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A handle assembly comprising:

a hub body extending along a central longitudinal axis having a first end portion including a first set of handle adapter engagement features and a second set of handle adapter engagement features;

a handle adapter including at least one of a first set of hub engagement features for engaging the first set of handle adapter engagement features or a second set of hub engagement features for engaging the second set of handle adapter engagement features, and wherein the handle adapter forms a ring;

wherein the first set of handle adapter engagement features includes at least one first protrusion or at least one first recess, and the first set of hub engagement features includes the other of the at least one first protrusion and the at least one first recess;

wherein the at least one first protrusion includes a handle adapter protrusion located at a proximal end of the handle adapter and on a perimeter of the ring and the at least one first recess includes hub recess formed adjacent a perimeter of the hub body;

wherein the handle adapter includes an inner surface that engages a retention flange on the hub body, and wherein the retention flange includes a plurality of protrusions on a radially inner side of the retention flange and the ring includes a flange having alignment protrusions that extend radially inward from the flange and are aligned with a corresponding one of the plurality of protrusions on a radial inner side of the retention flange;

a protrusion extending longitudinally from the first end portion of the hub body and located within an opening in the handle adapter; and a handle engaging both the handle adapter and the hub body, and wherein the handle includes a hub protrusion having a plurality of alignment recesses that align with corresponding ones of the plurality of protrusions on the radially inner side of the retention flange.

2. The assembly of claim 1, further comprising a retention pin extending through the handle and protrusion extending from the first end portion of the hub body.

* * * * *